Sept. 3, 1935. N. OBRAM 2,013,006
INTERNAL COMBUSTION ENGINE RECEIVING LIQUID FUEL
Original Filed Aug. 20, 1931 3 Sheets-Sheet 1

Inventor.
Nicolas Obram
per J. Govern
Attorney.

Sept. 3, 1935. N. OBRAM 2,013,006
INTERNAL COMBUSTION ENGINE RECEIVING LIQUID FUEL
Original Filed Aug. 20, 1931 3 Sheets-Sheet 2

Inventor
Nicolas Obram
per J. Gevers
Attorney.

Sept. 3, 1935.  N. OBRAM  2,013,006
INTERNAL COMBUSTION ENGINE RECEIVING LIQUID FUEL
Original Filed Aug. 20, 1931  3 Sheets-Sheet 3

Inventor
Nicolas Obram
per: Severn
Attorney.

Patented Sept. 3, 1935

2,013,006

UNITED STATES PATENT OFFICE 2,013,006

INTERNAL COMBUSTION ENGINE RECEIVING LIQUID FUEL

Nicolas Obram, Antwerp, Belgium

Application August 20, 1931, Serial No. 558,306
Renewed July 9, 1935. In Belgium February 12, 1931

1 Claim. (Cl. 123—32)

The present invention consists in improvements in internal combustion engines working with compression ratios sufficiently elevated for obtaining self ignition of the injected liquid fuel, and the object is to obtain a more efficient and more rapid combustion, so as to increase the speed of rotation of the engine and its power; furthermore, the particular shape of the improved combustion chamber will allow the admission in the cylinder of quantities of fuel and of oxygen considerably approaching the theoretical proportions for complete combustion.

These results are obtained by the moderate whirling of the air compressed by the piston in front of the fuel injector and also by the particular combustion chamber provided in the cylinder head.

The advantages secured by the present device will appear from the following descriptive specification, which points out that the improvements thus applied to engines of the type specified, result from the particular position selected for the combustion chamber to obtain the rotary whirling action, from the particular shape given to the combustion chamber favouring said rotary whirling, from the communication means between said combustion chamber and the cylinder, and from the particular arrangement of the valves opening within the new combustion camber.

The invention is illustrated, by way of example, in the accompanying drawings, in which Figs. 1, 2 and 3 illustrate sectional views of the cylinder head and particularly shaped combustion chamber; Fig. 1 is a horizontal section; Figs. 2 and 3 are vertical sections taken at an angle of 90°.

Figs. 4, 5 and 6 correspond to Fig. 3 and illustrate the favourable effect of the whirling obtained by the particular construction and arrangement of the combustion chamber;

Figs. 7 and 8 illustrate, in horizontal section, the cylinder head in conformity with the invention and in which are provided one or two valve seats, this general application being provided for engines having separate intake valves and exhaust.

Figs. 1 and 2 furthermore illustrate the arrangement of the valves, whereas Fig. 3 illustrates the off-set position of the combustion chamber and the possibility of providing supplementary valves in that part K of the cylinder head M which remains free at the side of the new combustion chamber C. Such construction is convenient for certain cases which will be referred to hereafter.

The main feature of the invention consists in the local arrangement of the combustion chamber in the cylinder head, namely between the axis of the cylinder and the periphery of the head. Indeed, it is shown in Fig. 3 that said combustion chamber provided in the cylinder head is highly off-set with respect to the axis of the cylinder, so as to be placed between said axis and the peripheral part of that side of the cylinder head; this arrangement is given to the combustion chamber C to secure, during the compression stroke, a regular and increasing whirling action to the air compressed by the piston, said whirling progressing with the piston ascending to its upper dead center. This particularly situation of the combustion chamber not only secures a more favourable mixing of the injected fuel with the compressed air owing to its regularity, but it also leaves a free space K suitable for lodging intake valves in the cylinder head in the case of engines in which separate intake and exhaust valves are employed.

The combustion chamber is characterized by its shape much favourable to the rotary whirling action. This chamber is laterally limited by parallel planes arranged symmetrically with respect to a plane containing the cylinder axis. In said parallel or nearly parallel planes are provided the valve seats.

The outer semi-circular portion of the combustion chamber is provided with a rib N facilitating the passage of gaseous fluid during the opening of the valves. This rib allows, furthermore, to reduce the volumetric capacity of the chamber C to a minimum.

The combustion chamber communicates with the cylinder by a passage, the section of which is nearly equal to the greatest section of the combustion chamber C, this to avoid any throttling of the gaseous fluid, and this also reduces the loss of heat.

Another characteristic feature consists in the fact that both lateral circular walls of the chamber are provided with openings arranged to constitute the respective seats of two valves, which are arranged oppositely to each other; these valves are distinguished by the fact that, contrarily to the ordinary practice, that is to say instead of acting the one for intake and the other for exhaust, both cooperate simultaneously to the same function, they act both for the exhaust only, or they can act both for the intake and for the exhaust, this will be the case when the present invention is applied to aeronautical engines having atmospheric exhaust.

In the drawings, the valves are designated by S and their stems by t.

The injection device is designated by i and the piston by P.

Fig. 7 shows the possibility of providing in the cylinder head K a valve seat S' for one single intake valve, whereas

Figure 1:
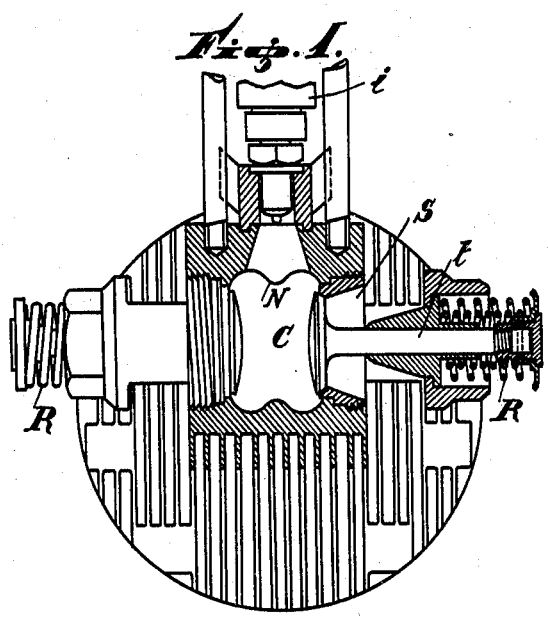
Figure 2:
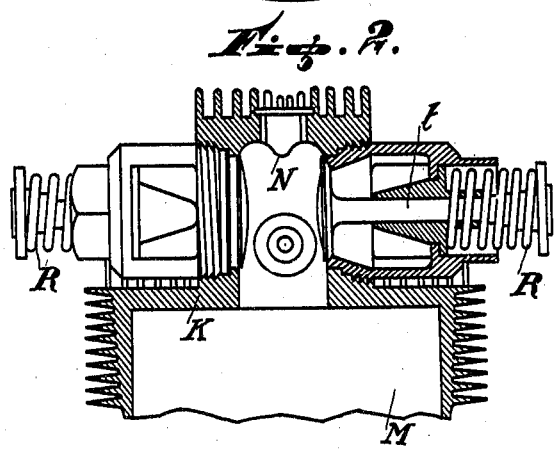
Figure 3:
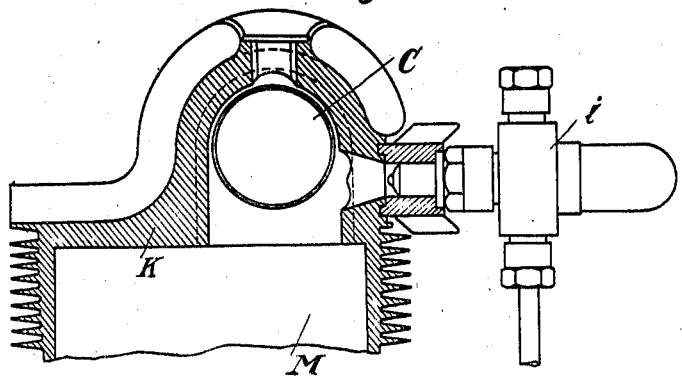
Figure 4:
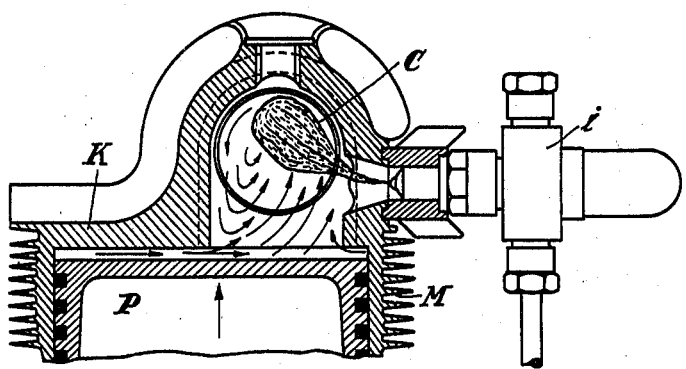
Figs. 4, 5 and 6 illustrate different stages of the inection of fuel and show the whirling of the air compressed by the piston, as also the penetration of the spray from injector i into said compressed and moving air.

Fig. 4 illustrates the starting of the injection, when the piston P arrives at a position of about 20 to 25° before the upper dead center. The air compressed by the piston and occluded between the piston P and the cylinder head K, is directed in the course indicated by small arrows, towards the combustion chamber C, where occurs the circular whirling and mixing of the air. Under the action of the air flow thus secured, the combustible spray is deviated towards the upper part of the combustion chamber, so as to produce by self ignition the starting of the combustion in the upper portion of the chamber C.

Figure 5:
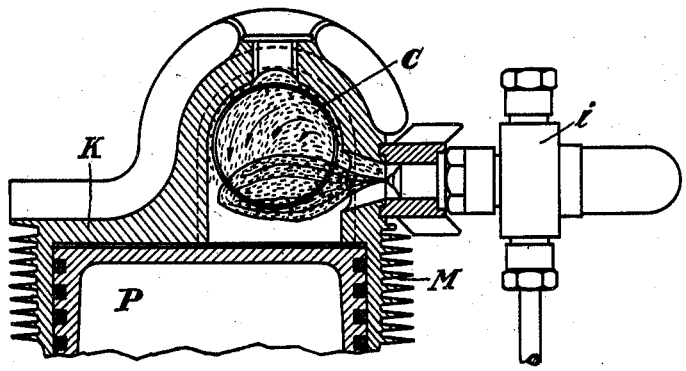

Fig. 5 shows the piston P in its upper dead center. At this moment there is no air current or air passage between the combustion chamber C and the cylinder M.

The gaseous mass occluded within the combustion chamber C, under the influence of its inertia, tends to continue its whirling movement about the axis of the chamber, but this whirling movement of the gaseous mass is strongly modified by the combustion and the increase of pressure produced in the upper portion of the chamber C, so that the gaseous molecules are directed downwards within the chamber C. The arrows in Fig. 5 show the direction imparted to said gaseous molecules.

Under the influence of the thus generated gaseous flow, the combustible spray steadily supplied by the injector, is brought back in its normal position and starts to saturate or carburate the totality of the air remaining in the central portion of the combustion chamber.

Figure 6:
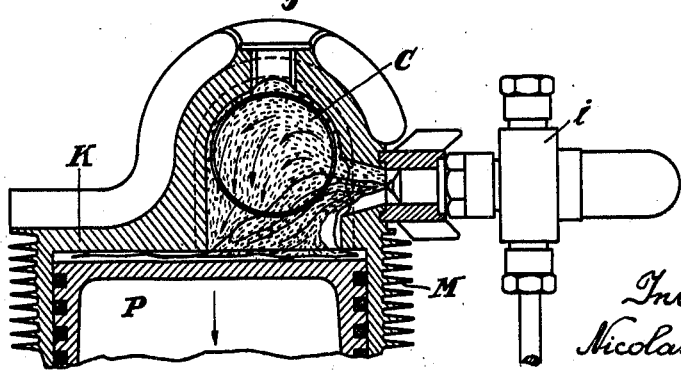
Figure 7:
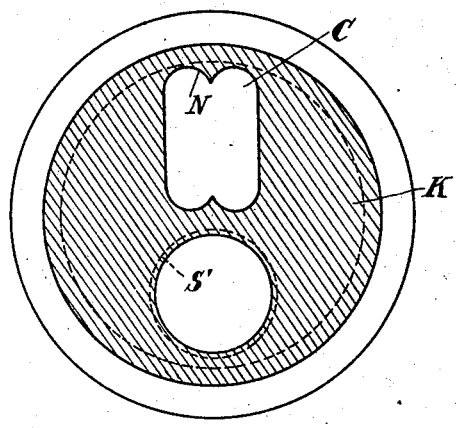
Figure 8:
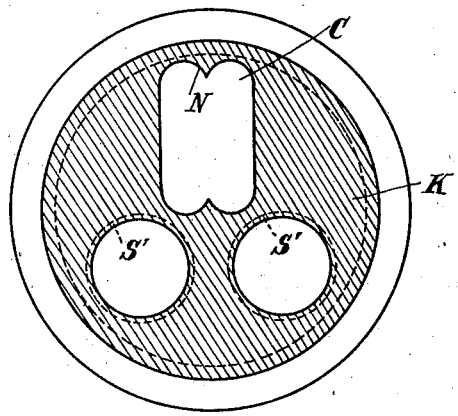
Fig. 8 illustrates a form of embodiment in which two valve seats are machined in the cylinder head.

Fig. 6 illustrates the end of the injection when the piston P is at about 20 or 25° past the upper dead center.

Owing to the rapid increase of volume produced in the cylinder and under the effect of the very great pressure existing in the combustion chamber, the gaseous molecules are directed into the cylinder M and the combustible spray is deviated towards the cylinder under the action of said gaseous current; this spray is drawn inside the cylinder to be mixed with the remaining air.

The fuel spray, under the action of said moderate whirling, is at first slightly deviated upwards, then acts on the center of the chamber, and at the end of the injection the fuel is directed downwards towards the combustion chamber. By the action of the moderate whirling, the combustible spray perfectly and completely penetrates into the inner part of the combustion chamber, and is not influenced by the considerable centrifugal forces generally generated by the violent whirlings and which deflect the combustible towards the periphery of the combustion chamber, whilst leaving the compressed air in the center of this chamber free from combustible material.

Another considerable advantage of the present device consists in the fact that the whirling is obtained by the single action of a piston having a plane end face, without any appendice or projection capable of sensibly increasing the heated surface of the piston. In the new device, the piston has a minimum surface contacting with the heated gases, so that exchange of heat is reduced to a minimum.

I claim:

In an internal combustion engine of the fuel injector type having a flat ended cylinder and a flat ended piston, the arrangement of a combustion chamber in the cylinder head characterized by its position, shape and construction, said combustion chamber being arranged intermediate the cylinder axis and the periphery of the cylinder without extending out of said periphery and comprising two parallel side walls symmetrically arranged with respect to a plane containing the cylinder axis, said chamber being limited in its outer portion by half a surface of revolution determined by the rotation of a generatrix about an axis at right angles to said plane, and in its inner portion by said parallel walls and by walls at right angles to the cylinder bottom and substantially tangent to the surface of revolution of the outer chamber portion so that the chamber communicates with the cylinder room by a section not less than the greatest transverse section of the chamber, and two valves being arranged in front of each other and the heads of which form the main portion of said parallel walls, whereby the axes of said valves are coinciding with the axis of revolution mentioned herebefore.

N. OBRAM.